United States Patent [19]

Leitz et al.

[11] 4,195,425
[45] Apr. 1, 1980

[54] SYSTEM FOR MEASURING POSITION AND/OR VELOCITY

[75] Inventors: Ludwig Leitz; Knut Heitmann, both of Wetzlar, Fed. Rep. of Germany

[73] Assignee: Ernst Leitz Wetzlar GmbH, Wetzlar, Fed. Rep. of Germany

[21] Appl. No.: 866,908

[22] Filed: Jan. 4, 1978

Related U.S. Application Data

[63] Continuation of Ser. No. 671,104, Mar. 29, 1976, abandoned, which is a continuation-in-part of Ser. No. 376,418, Jul. 5, 1973, abandoned.

[30] Foreign Application Priority Data

Jul. 17, 1972 [DE] Fed. Rep. of Germany ....... 2235020

[51] Int. Cl.² .................. G01P 3/36; G01C 3/00; G01C 3/08
[52] U.S. Cl. .................. 356/28; 180/169; 340/53; 352/140; 356/1; 356/4; 356/373
[58] Field of Search ........... 356/1, 4, 5, 28, 156, 356/172; 352/140; 340/53; 180/98

[56] References Cited

U.S. PATENT DOCUMENTS

| | | | |
|---|---|---|---|
| 3,059,521 | 10/1962 | Clemens et al. | 356/28 |
| 3,278,895 | 10/1966 | Pfund | 340/34 |
| 3,494,694 | 2/1970 | Morita | 352/140 |
| 3,711,200 | 1/1973 | Maughmer | 356/28 |

FOREIGN PATENT DOCUMENTS

| | | | |
|---|---|---|---|
| 903962 | 2/1945 | France | 352/140 |
| 1249302 | 10/1971 | United Kingdom | 356/28 |

*Primary Examiner*—S. C. Buczinski
*Attorney, Agent, or Firm*—Gilbert L. Wells

[57] ABSTRACT

System for measuring the relative position and/or velocity of two objects with respect to each other and/or with respect to a common reference system, such as the ground, according to the magnitude and direction thereof, using electro-optical measuring means, the improvement comprising:

(1) producing images of the object to be measured in at least two different spatial positions;
(2) producing A.C. electrical signals of different frequency proportional to the relative movements of these images to at least one optical correlation system; and
(3) evaluating these signals, with the use of the trigonometrical relationships of the perspective imaging, in a computer to determine the measured values.

17 Claims, 11 Drawing Figures

SYSTEM FOR MEASURING POSITION AND/OR VELOCITY

CROSS REFERENCES TO RELATED APPLICATIONS

This is a continuation, of application No. 671,104, filed Mar. 29, 1976, which is in turn a continuation-in-part of application Ser. No. 376,418 filed July 5, 1973, both abandoned.

Applicants claim priority under 35 U.S.C. 119 for Application Ser. No. P 22 35 020.5 filed July 17, 1972 in the Patent Office of the Federal Republic of Germany. The priority document is contained in the file of application Ser. No. 376,418, filed July 5, 1973.

The disclosure of copending application Ser. No. 344,484, filed Mar. 26, 1973, in the U.S. Pat. Office now abandoned is incorporated herein, Application Ser. No. 344,484 discloses the state of the art of systems for measuring, controlling and/or indicating the movement of land vehicles with respect to surroundings.

BACKGROUND OF THE INVENTION

The present invention relates to a method for measuring the relative position and/or velocity of two objects with respect to each other and/or with respect to a common reference system (e.g. the ground) in accordance with magnitude and direction, using electro-optical measuring means, as well as the apparatus for conducting this method.

Various methods have been known for the electro-optical measurement of distances or for the focusing of objectives to desired distances. In this connection, active and passive measuring methods can be distinguished.

The active measuring methods serve to detect, pursue, and measure the distances of an object by means of electromagnetic waves (radar) by transmitting a narrowly beamed signal and receiving the echo. The distance e is calculated with the velocity of light c and the transit time t of the signal according to the relationship $e = tc/2$. Radar instruments in the form of velocity measuring devices make it possible to determine the speed of moving objects with the aid of the Doppler effect or the transit time determination of a pulse. These instruments are employed predominantly in traffic technology, in navigation, in ballistics, and in missile technology. Pulse radar devices are used for determining the speed primarily in the case where the range of the Doppler radar devices is insufficient due to the distance of the object to be measured. The velocity measurement in these devices is accomplished by a continuous distance determination of the moving object.

The disclosure of U.S. Pat. No. 3,689,882 of Dessailly is incorporated herein. This patent discloses an anti-crash radio-detector system for automotive vehicles adapted to take into account the traffic conditions and to prevent an accident when an obstacle is detected ahead. This system is characterized in that it comprises a radio-electric or radar detector, a device for producing from the information delivered by the detector another information concerning the approach speed of the equipped vehicle, an electronic computer for determining a first safety distance and a second safety distance, a light and/or sound alarm device, and a device for controlling the braking system.

Laser range finders used, according to the state of the art, operate according to the principle of pulse transit time (light radar). Disadvantages of these active measuring methods are the disturbance of the surroundings, expenditure of cost in the apparatus, probing difficulties with respect to the echoes, and disclosure of the measuring position by the radiation. The active processes not employing lasers require special reflectors at the measuring object which amplify the echo.

In the passive measuring methods, accessory-equipped, single objective telescopes, or binocular telescopes having an increased distance of the viewing axes are used. The coincidence of the images supplied by the optical pupils or the highest contrast of the image focusing is recorded by means of a photoelectric scanning device. In this method, a compensating or position-finding movement is required. However, such position-finding movement necessitates time, which is tantamount to a loss in signal energy during the time of searching.

SUMMARY OF THE INVENTION

It is an object of the present invention to derive a measurement of the distance and/or velocity from the movement of the image of an object, extensively avoiding the disadvantages of the prior art.

This object is achieved by means of a method of the type indicated in the foregoing, which is characterized by the fact that images of the object to be measured are produced in at least two different spatial positions; that A.C. electrical signals of differing frequency proportional to the relative movements of these images to at least one optical correlation system are produced; and that these signals, with the use of the trigonometrical relationships of the perspective reproduction, are evaluated in a computer system with respect to the values to be determined.

BRIEF DESCRIPTION OF THE DRAWINGS

The invention is explained in greater detail below with reference to embodiments illustrated schematically in the drawings, wherein.

DESCRIPTION OF THE PREFERRED EMBODIMENTS

Figure 1:
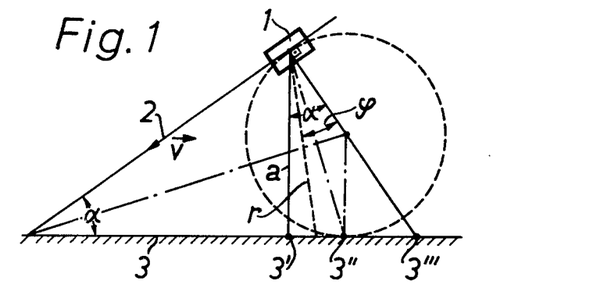
FIG. 1 shows the geometrical relationships on which the method is based.

According to FIG. 1, an object 1 moves relative to a straight base line 3 at the velocity $\vec{v}$ illustrated by the arrow 2. Various measuring points 3', 3", 3"' are marked on the base line 3. As seen from the object 1, the measuring point 3"' lies exactly normal to the direction of movement $\vec{v}$, and is disposed in the direction $\phi = 0°$. The points 3" and 3', respectively, are disposed in directions $\phi$ greater than 0. On the basis of the relative motion between object 1 and the measuring points 3', 3", 3"', the latter are characterized by their distance r from the object, their directional angle $\phi$, and their angular velocity $\dot\phi = d\phi/dt$. The following applies: $\dot\phi = v/r \cos \phi$.

The spacing of the object 1 from the straight line 3 is assumed to be $r = a$, this being the distance of the plumb-line base 3' with the angle of direction [collimation] $\phi = \alpha$. $\alpha$ likewise appears as the angle between the straight line 3 and $\vec{v}$. In the case of a variable angle of direction $\phi$, the distance of the measuring points r and also their angular velocity $\dot\phi$ is, therefore, variable, and the following applies:

$$r_{(\tau)} = \frac{a}{\cos(\alpha - \tau)} \text{ or } \dot\phi_{(\tau)} = \frac{v}{a} \cos\phi \cos(\alpha - \phi).$$

For $$\phi = \frac{\alpha}{2}, \dot\phi$$

reaches a maximum $$\dot\phi_{max} = \frac{v}{a} \cos^2 \frac{(\alpha)}{(2)}.$$

This maximum angular velocity is determined in a simple manner from the viewpoint of measuring technique, by scanning.

In the case where the object 1 is an airplane approaching a landing strip 3, wherein the elevation a and velocity $|\vec{v}|$ of the airplane are known with respect to their amounts, then the approach angle $\alpha$ is immediately determined from the angle $\phi = \alpha$, for which the measured landing strip indicates maximum angular velocity. If $\dot\phi_{max}$ itself is known, then it is merely necessary to measure the elevation a or the velocity $|\vec{v}|$.

Figures 2, 3:
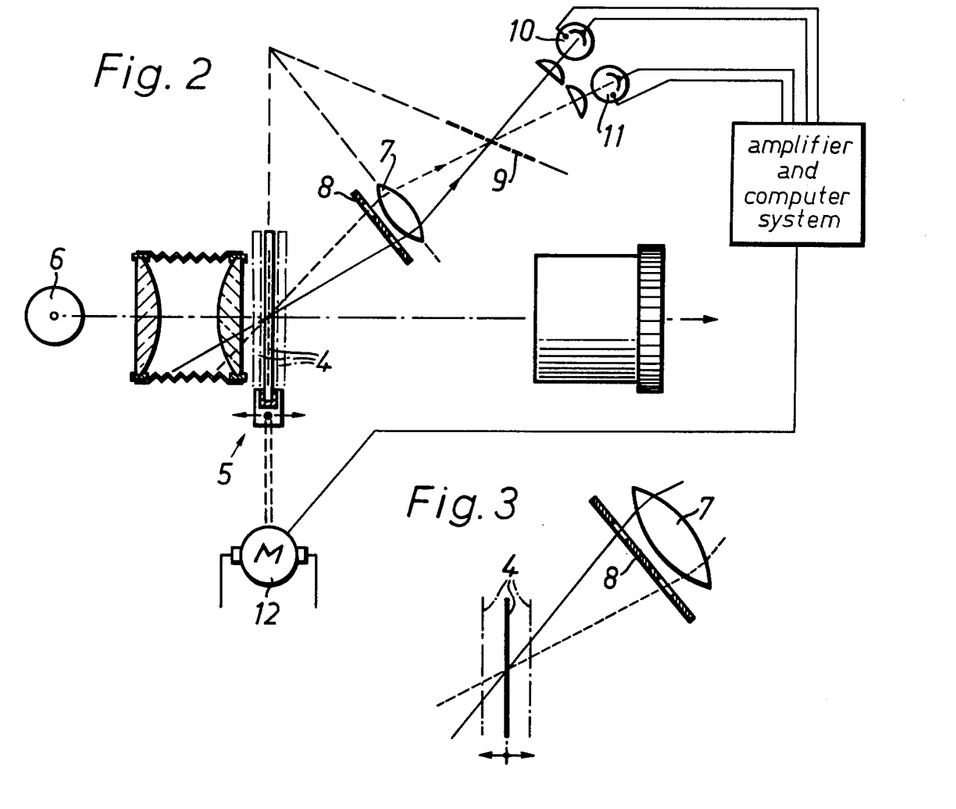
FIGS. 2 and 3 show a device of the present invention for focusing a slide projector and the principles thereof.

A diapositive 4 in FIG. 2 is disposed in the projection frame 5 of a slide projector to be displaceable in parallel to the optical axis. By scattered light from the projection lamp 6, the diapositive 4 is imaged, by means of an optical system 7 arranged laterally of the main beam path, through two apertures of an apertured diaphragm 8 disposed in front of the optical system, onto a transillumination grating 9.

The imaging light fluxes associated with the apertures of the diaphragm 8 then pass to two corresponding photoelectric receivers 10, 11. FIG. 3 shows that the portions of the diapositive 4 imaged through the two apertures of the diaphragm 8 have equal distance from the corresponding nodal points of the optical system 7 only if the diapositive is in the optimum, central position. In this case, the signal frequencies, produced at the outputs of the photoelectric receivers 10, 11 upon a complementary movement of the grating 9 in its plane, are equal. In case the signal frequencies are different from each other, the diapositive is shifted into the optimum position by way of an electronic control circuit, such as disclosed in U.S. Pat. Nos. 3,537,791, 3,517,992, 3,494,694, 3,471,225, and a servomotor 12.

A special advantage of this arrangement resides in that the adjustment is based on the structure of the diapositive proper, in contrast to the customary automatic focusing method, which is subject to difficulties due to multiple reflection on the glass covers.

The device just described can be employed, with corresponding modification, also for the monitoring of variable levels of liquids and optionally for the control thereof.

Figure 4:
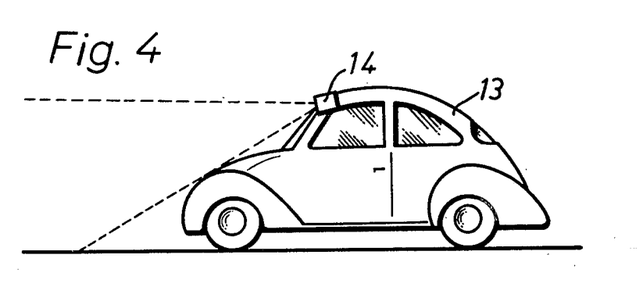
FIGS. 4–8 show measuring instruments mounted on a vehicle, by means of which sections of the roadway disposed at different distances in the driving direction are evaluated.

FIG. 4 illustrates a vehicle 13. The measuring instrument 14 is mounted to the front windshield of the vehicle at the top in the interior of the vehicle so that measuring angles approximately subtending the radiator hood up to slightly above the horizon are detected.

Figure 6:
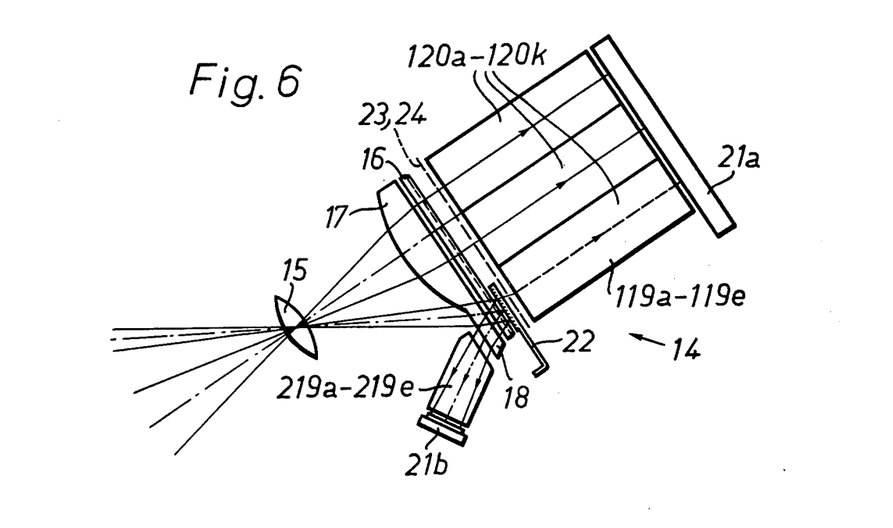

FIG. 6 shows an embodiment of the measuring instrument 14 in detail in a lateral view. The measuring light impinges, coming from the left, through an entrance objective 15 on a transillumination grating plate 16 with an optical collector unit 17 disposed in front thereof. The optical collector unit 17 has a lateral extension 18, through which part of the light fluxes affected by the plate 16 is conducted to a special group 21 of photoelectric receivers in a manner which is described below.

Figure 5:
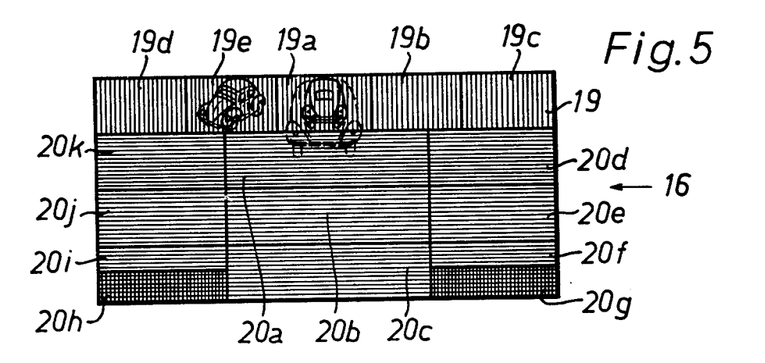

The transillumination grating plate 16 is illustrated in detail in FIG. 5. This plate is subdivided into several lines and columns. The uppermost line comprises a series of zones 19a through 19e with vertical grid lines. Three further lines follow having horizontal grid lines, each of which has three zones, denoted by 20a through 20f, and 20f through 20k. Within the zones 20f through 20i, cross-wise patterned zones 20g and 20h, respectively, are provided additionally, serving for the determination of the vehicle speed v along the ground. The plate 16 is arranged within the measuring device according to FIG. 7 so that the grating zones 19a-19e are adjacent to the extension 18 of the optical unit 17. Each of the grating zones is associated via a light-conducting channel 119a-119e, 120a-120k, and 219a-219e with a pair of photoelectric receivers, arranged in groups 21a through 21b.

Figure 7:
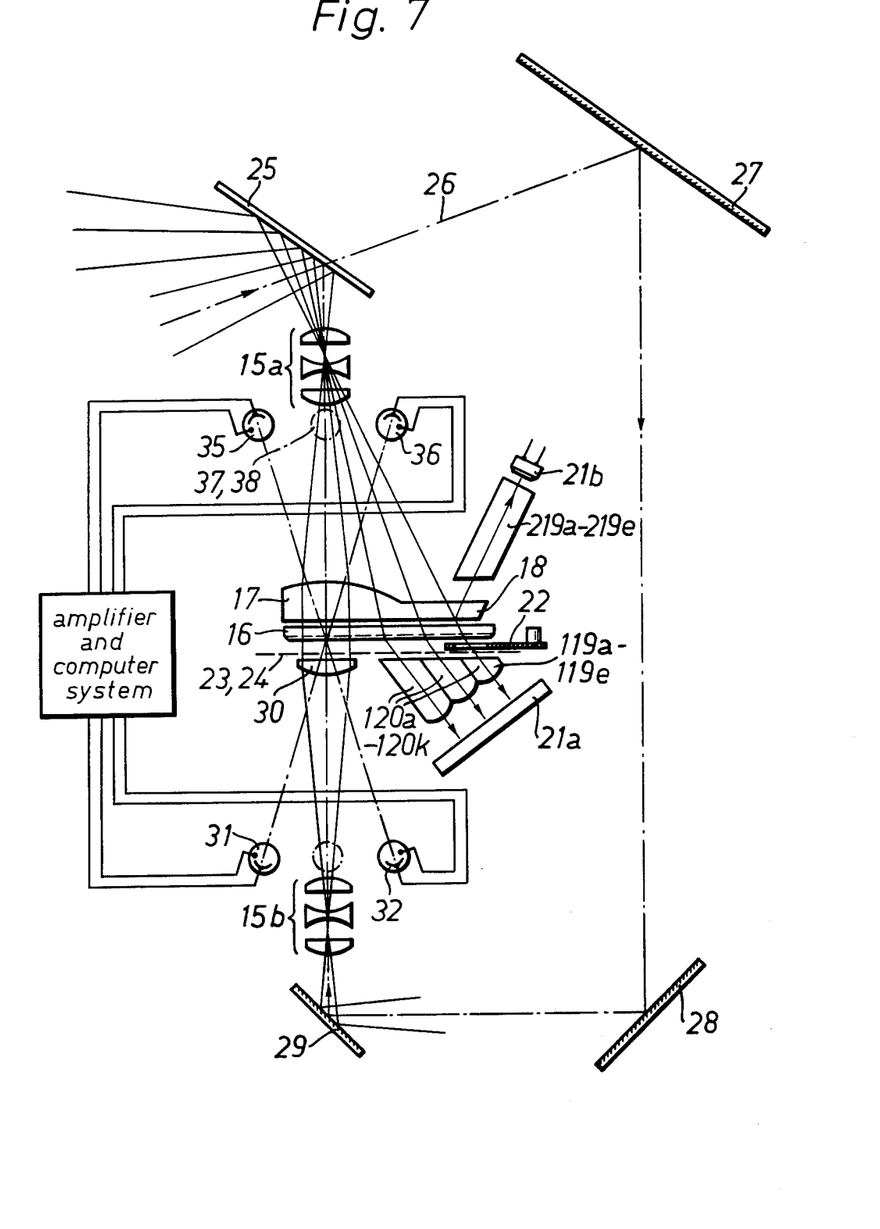

A reflecting diaphragm plate 22 with a cutout of the size of one zone is displaceably arranged behind the grating zones 19a through 19e so that the light fluxes affected by these grating zones are reflected via light-conducting channels 219a-219c onto the group 21b of photoelectric receivers and at each instant only one photoelectric receiver pair of the group 21a receives light respectively from the raster zones 19a-19e.

In order to obtain signals with the correct arithmetic sign, the grating plate 16 is associated with an electric driving unit, such as shown in FIGS. 1 and 1a of U.S. Pat. No. 3,533,702, which sets the plate laterally into oscillatory motion.

The device described thus far has the following function: As seen from the moving vehicle 13, the roadway ahead appears as a broad band moving toward the vehicle and sliding by underneath the wheels. The structures of this band have a low angular velocity toward the horizon, for example in the zone 20a. This angular velocity increases with decreasing distance. In correspondence with the distance of the roadway structure imaged on the grating plate 16, a broad spectrum of signal frequencies is produced at the outputs of the associated pairs of photoelectric receivers. These signal frequencies have low values from the zone 20a up to high values from the zone 20c. Upon the appearance of an obstacle [structure, vehicle] on the grating plate 16 ("free driving space"), a portion of the signal frequencies is eliminated. If this obstacle then moves along at a constant distance, measuring signals are produced thereby only if the measuring arrangement itself is exposed to driving vibrations. In contrast thereto, if the distance to the obstacle changes, increasingly higher frequencies are superimposed in the "free driving roadway spectrum". The speed of the frequency clipping can serve as the initiating criterion for effects on the vehicle carrying out the measurement, e.g., throttling of the gas, braking, deployment of a deceleration bag in the front.

Figure 8:
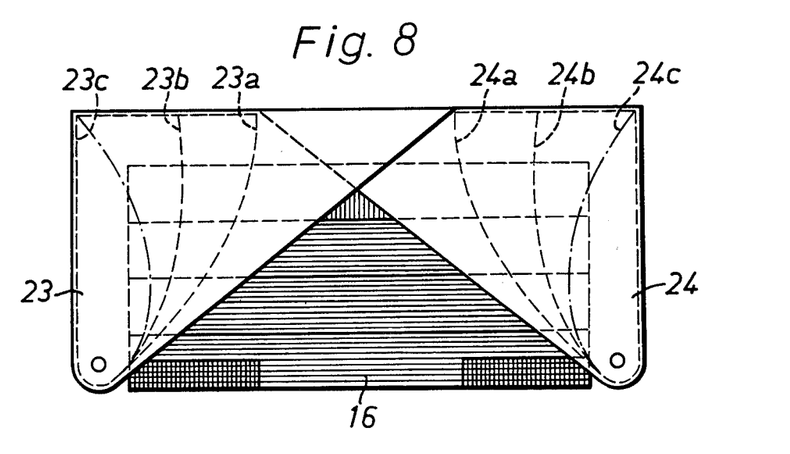

FIG. 8 is a top view of a shutter 23, 24 arranged as a supplementary part between the grating plate 16 and the light-conducting channels 119, 120. This part is illustrated in FIG. 7 by a broken line. In combination with the reflecting diaphragm 22, the shutter 23, 24 is coupled with the steering control of the vehicle 13 and serves for separating the "free driving space" during straight driving as well as during traversal of a curve preferably dependent on the velocity from the remaining surroundings, whereas the latter and movements therein are further detected separately therefrom. The latter feature is particularly important when driving through intersections. As illustrated, blades 23, 23a to 23c, and 24, 24a to 24c are provided of the iris diaphragm type for the separation method. The contour drawn in full lines shows a position during straight forward driving, and the dot-dash line contour shows a position during extreme curve driving. Correspondingly, the light fluxes pass from the grating zone 19a to the group 21a of photoelectric receivers during straight driving, whereas the light fluxes from the grating zones 19c or 19d are transmitted to this group 21a only when traversing an extreme curve. Accordingly, a determination can also be effected when driving through a curve to find out whether an obstacle approaches on a collision course, or whether this obstacle moves out of the free driving space due to a correspondingly great transverse movement. A transverse movement produces a corresponding asymmetrical signal at one of the pairs of photoelectric receivers associated with the zones 19a through 19e.

In FIG. 7, a modification of the arrangement of FIG. 6 is illustrated wherein identical reference numerals point to analogous components. In this embodiment, means are additionally provided for determining, from the angular velocity $\phi$ of the ground in two different distances r and r+$\Delta$r, the speed v of the vehicle along the ground.

For this purpose, a portion 26 is branched off from the measuring light impinging from the left hand side, by means of a reflecting splitter 25. This portion 26 is transmitted, via three deflecting mirrors 27, 28, 29, the entrance objective 15b, and the collector lens 30, to the rear of the grating plate 16. This has the effect that a close range portion of the roadway is reproduced under a fixed angle $\phi$ in two different distances r and r+$\Delta$r on the crossed grating zones 20g, 20h of the grating plate 16 provided for this purpose. These zones 20g, 20h are made to be opaque in the form of incident illumination gratings. In order to evaluate the light fluxes leaving these zones, respectively, four photoelectric receivers 31, 32, 33, 34 and 25, 36, 37, 38, respectively, are arranged in corresponding directions in the front and in the rear.

Figure 9:
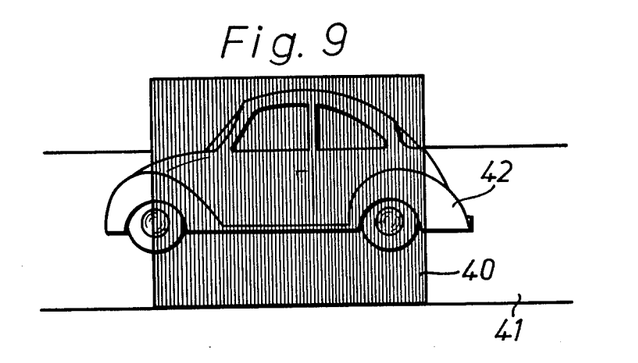
FIG. 9 illustrates the relationships in the evaluation of objects to be measured in accordance with the present method used in a vehicle at a right angle to the travel direction of the vehicle itself.

FIG. 9 shows, in a view through a side window of the vehicle, a correlator measuring image field 40, together with the roadway 41 to be monitored, lying therebehind, and a passing foreign vehicle 42 to be measured. As can be seen, the image of the roadway 41 falls on the lower portion of the measuring image field 40, whereas the image of the foreign vehicle 42 falls on the upper portion. The vehicle 42 in this way interrupts the continuous frequency spectrum $\phi_{(r)}$ of the roadway 41 which is characterized, on the one hand, by the continuous decrease in the frequency level with increasing distance r toward the upper portion of the measuring image field 40 and, on the other hand, with respect to the absolute frequency level, by constants of the apparatus, such as grating interval and focal length, and furthermore by the inherent speed above ground.

In this case, three variables are available for determining the velocity of the vehicle 42:

The frequency of the vehicle 13 with respect to the roadway, $\phi_E$, the absolute velocity value of which is calibrated;

the frequency $\phi_F$, stemming from the inspected vehicle 42;

the lowest frequency $\phi_R$ of the roadway spectrum still remaining after superposition by the vehicle 42.

The latter frequency $\phi_R$ then corresponds with certainty to the distance R present between the vehicle 13 and the vehicle 42. $\phi_F$ is apparent in the total signal spectrum by a stronger, transient signal of a specific frequency.

From these three values, the velocity of the vehicle 42 along the ground can be determined by means of an electronic computer, as disclosed in U.S. Pat. No. 3,094,601.

By means of the device described thus far, $\phi_R$ and R may only be measured while driving.

If it is intended to detect the velocity of vehicle 42 also from vehicle 13, which is at a standstill, an optical correlator system with correlators staggered at a depth basis $\Delta$r is employed for this purpose. This device is directed laterally out of the vehicle 13 toward the passing vehicles so that the latter temporarily cover the measuring fields. Four variables are available in this case for calculation purposes:

The calibrated frequency of the vehicle 13, $\phi_E$ the two frequencies $\phi_1$, $\phi_2$ of the vehicle 42 from the depth basis; and the known depth basis $\Delta$r, i.e. the known distance of the optical nodal points. In the case of a standing vehicle $\phi_E$ simply becomes zero in this instance.

Figure 10:
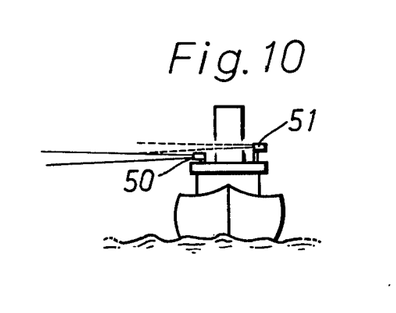
FIGS. 10 and 11 show a measuring instrument with correlators staggered in depth with minor lateral displacement on a ship.
Figure 11:
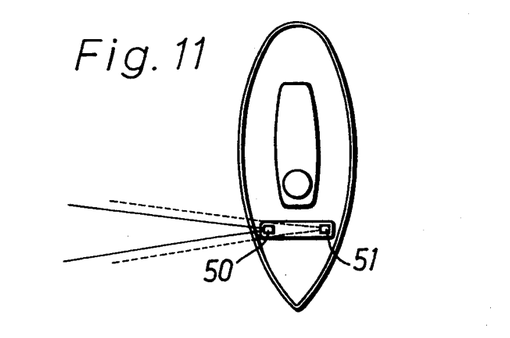

FIGS. 10 and 11 show, in a front and top view, respectively, two correlators 50 and 51, the entrance viewing angles of which are arranged offset in superposed relationship (one shows the other) so that the image fields are not impeded by the contours of the instruments. The correlators are mounted on the bridge so that the width of the bridge can be extensively used for the depth-based measurement.

Additional applications of the method are possible, for example, for the orientation of blind persons.

We claim:

1. In a system for measuring the relative position and/or movement in magnitude and direction of an object being without special optical markers thereon, said object being measured with respect to a reference by using at least an imaging system, at least one grating positioned at least in the vicinity of the image plane of said imaging system and coordinated with at least one measuring direction and photoelectric detectors associated with said grating and generating electrical signals according to light fluxes emanating from said grating, the improvement comprising:

forming by said imaging system in a first and/or at least in a second measuring direction an image each of said object and said reference respectively on said grating in positions spatially separated, said images of said object and said reference differing from one another in image scale and perspective caused by different object distance and different reference distance respectively from said grating; generating for each measuring direction according to the interaction between said images and said grating electrical A.C. signals, the frequencies of which differ in dependence upon said different image scale and said perspective and being proportional to the relative position and/or movement of said object to be measured; and evaluating said electrical A.C. signals by employing the trigonometrical relationships of said image scale and said perspective for producing signals indicating the position and the movement of said object, said trigonometrical relationships of said image scale being defined by the ratio image size/object size, said trigonometrical relationships of said perspective being defined by the depiction of spatially extended objects on a plane surface.

2. The system of claim 1, comprising an optical correlator having said at least one imaging system, at least said one grating positioned at least in the vicinity of the image plane of said imaging system and coordinated with at least one measuring direction, and said photoelectric detectors, said imaging system forming in a first and/or at least in a second measuring direction from said object and said reference images differing in image scale and perspective on said grating in positions located in at least one plane but spatially separated, said photoelectric detectors generating said electrical A.C. signals from light fluxes leaving said grating;

processing said A.C. signals of said photoelectric detectors in computing means by employing said trigonometrical relationships, whereby resulting signals are also proportional to the relative movement and the position between said images and said grating, said resulting signals being further proportional to the relative movement and the position between said measuring system and said objects and said resulting signals being yet further proportional to the relative movement and the position between said object and said reference object.

3. The system of claim 1, comprising a first optical correlator having said at least one imaging system, said at least one grating positioned at least in the vicinity of a first image plane of said first imaging system, and coordinated with at least one measuring direction, and first photoelectric detectors associated with said first grating and generating first electrical A.C. signals according to light fluxes emanating from said first grating, using as said reference a second optical correlator containing at least a second imaging system, at least a second grating positioned at least in the vicinity of an image plane of said second imaging system and also coordinated with at least one measuring direction, and second photoelectric detectors associated with said second grating and generating second electrical A.C. signals according to light fluxes emanating from said second grating, arranging said first and said second correlators in positions spatially separated with respect to said object to be measured, forming from said object to be measured one image each in said first and second image plane of said optical correlators; said images differing from one another in image scale and perspective thus causing a difference in frequency between said first and second electrical A.C. signals;

processing said first and second A.C. electrical signals in computing means by employing said trigonometrical relationships of said image scale and said perspective, the resulting signals therefrom being proportional to the relative movement and the position of said object.

4. The system of claim 1, wherein said positions spatially separated are disposed side-by-side with respect to said object to be measured.

5. The system of claim 1, wherein said positions spatially separated have angles of inclination differing with respect to said object to be measured.

6. The system of claim 1, wherein said images in said positions spatially separated are interrogated for generating said electrical A.C. signals.

7. The system of claim 2, wherein the distance between said positions spatially separated is a value given by the arrangement and the optical properties of said optical correlator and means are provided for calculating the magnitude and direction of the relative movement from said A.C. signals of said photoelectric detectors.

8. The system of claim 1, wherein the direction of relative movement between said object and reference is given and means are provided for calculating the distance and magnitude of the movement of said object from said A.C. signals of said photoelectric detectors.

9. The system of claim 1, wherein the magnitude of said movement is given and means are provided for calculating the distance and the angle of direction between said object to be measured and said reference from said A.C. signals.

10. In a system for measuring the relative position and/or movement in magnitude and direction of an object being without special optical markers thereon, said object being measured with respect to a reference using at least one imaging system, at least one grating positioned at least in the vicinity of the image plane of said imaging system and coordinated with at least one measuring direction, and photoelectric detectors associated with said grating and generating electrical A.C. signals according to light fluxes emanating from said grating, the improvement comprising:

using said system on an airplane having means for determining values of flying height and flying velocity;

providing said system with a plurality of optical correlators having imaging means and grating means as well as photoelectric detectors for detecting said object defined by the ground under a plurality of viewing angles;

producing from said object to be measured by said imaging means of said optical correlators images differing from one another in image scale and perspective in at least two distinct planes defining at least two positions spatially separated;

generating from light fluxes leaving said grating means A.C. signals the frequencies of which differ in dependence upon said image scale and said perspective;

said signals being also proportional to the relative position and/or movement between said images and said gratings; and determining from the maxima and minima of said signal frequencies said viewing angles and by including said values of flying height and flight velocity the approach angle of said plane.

11. In an apparatus for measuring the relative position and/or movement in magnitude and direction of an object without special optical markers thereon, said object being measured with respect to a reference, by using at least one optical correlator having at least one imaging system, at least one grating positioned at least in the vicinity of the image plane of said imaging system and coordinated with a first and/or at least in a second measuring direction, the photoelectric detectors and imaging with said imaging system said object to be measured and said reference on said grating and converting the light fluxes leaving said grating by said photoelectric detectors, the output signals of which are processed in computing means, the improvement comprising:

said apparatus mounted in a first vehicle;

said apparatus being provided with said at least one optical correlator equipped with means for indicating the correct arithmetical sign of said movement and having a broad directional characteristic;

said optical correlator disposed for detecting lateral sections of said roadway as said reference and a second vehicle passing by as said object to be measured, said lateral sections of said roadway and said second vehicle being imaged by said imaging system of said optical correlator on said grating in positions spatially separated, said images of said lateral sections of said roadway and said second vehicle respectively differing from one another in image scale and perspective caused by the different distances of said sections of said roadway and said second vehicle respectively from said grating, said photoelectric detectors of said optical correlator generating electrical A.C. signals, the frequencies of which differ in dependence upon said different image scale and perspective and being processed in said computing means for determining in magnitude and sign the relative movement and/or the distance of said second vehicle and/or the movement of said first vehicle with respect to said lateral sections of said roadway.

12. The apparatus of claim 11, wherein said optical correlator is mounted for detecting sections of said roadway perpendicularly moving to the direction of motion of said first vehicle.

13. In an apparatus for measuring the relative position and/or movement in magnitude and direction of an object without special optical markers thereon, said object being measured with respect to a reference, an optical correlator imaging with an imaging system said object to be measured on a grating coordinated with at least one measuring direction, and converting the light fluxes leaving said grating by photoelectric detectors the output signals of which are processed in computing means, the improvement comprising:

said apparatus mounted in a slide projector having an optical axis to detect as said object to be measured a diapositive positioned along said optical axis and in a plane perpendicularly extending to said optical axis for a position of optimum focusing;

said apparatus provided with two of said optical correlators laterally arranged to said optical axis;

said optical correlators furnished with a common imaging system and a common grating, each defining a plane intersecting with said plane of said diapositive in a unique line according to the Scheimpflug condition;

said optical correlators further furnished with a photoelectric detector each, the spatial positions of which define separate beams emanating from said object and intersecting with the optical axis of said imaging system in nodal points;

said imaging system forming in dependence upon said arrangement of said grating, images of different image scale and perspective;

said photoelectric detectors generating from each of said images electrical A.C. signals differing from one another in frequency and being out of phase upon displacement of said object and being in phase upon the position of optimum focusing; said position of optimum focusing being attained when said nodal points are equidistant of said optical axis of said imaging system;

said computing means being connected to a control circuit for the adjustment of said diapositive into a position of optimum focusing; and an electric drive provided for continuous movement of said gratings of said optical correlators.

14. In an apparatus for measuring the relative position and/or movement in magnitude and direction of an object without special optical markers thereon with respect to a reference object bearing no special optical markers thereon, an optical correlator imaging with an imaging system said object to be measured and said reference object with different image scale and perspective on a grating coordinated with at least one measuring direction and converting the light fluxes leaving said grating by photoelectric detectors, the output signals of which are processed in computing means, the improvement comprising:

said apparatus mounted on a vehicle;

said apparatus being provided with an optical correlator having at least said one grating subdivided in sections of different rulings;

said sections of said grating being arranged side-by-side in a plane for detecting under different viewing angles the movement of the surroundings of said vehicle inclusive the roadway in vertical and horizontal direction and generating therefrom electrical A.C. signals by said photoelectric detectors of said optical correlator;

means for laterally oscillating said grating in the plane;

said grating associated with a mask off device which exposes only those of said grating sections in which roadway obstacles on said roadway on collision course are reproduced even as said vehicle traverses a curve; and computing means having terminals connected to said photoelectric detectors.

15. The apparatus of claim 14, wherein sections of said grating are used as reflection gratings for light incident from both sides; thus defining at least two optical correlators located one behind the other with respect to said object to be measured.

16. In an apparatus for measuring the relative position and/or movement in magnitude and direction of an object without special optical markers thereon, said object being measured by using at least one optical correlator having at least one imaging system, at least one grating positioned at least in the vicinity of the image plane of said imaging system and coordinated with a first and/or at least in a second measuring direction and photoelectric detectors and imaging with said imaging system said object to be measured on said grating and converting the light fluxes leaving said grating by said photoelectric detectors, the output signals of which are processed in computing means, the improvement comprising:

said imaging system of said optical correlator defining at least two nodal points differently spaced with respect to said object to be measured and said reference respectively, light rays coordinated with said at least two nodal points having axes intersecting each other in the direction of said object and said reference respectively, said light rays producing at least in two separate spatial positions of said image plane two images of said object to be measured and said reference respectively differing from one another in image scale and perspective caused by said different distances of said nodal points from said object to be measured and said reference respectively, said photoelectric detectors connected to the terminals of said computing means generating electrical signals from light leaving said grating, the frequencies of said electrical signals differing in dependence upon said different image scale and said perspective of said images.

17. The apparatus of claim 16, wherein at least two optical correlators are provided in positions spatially separated, each containing one optical imaging system defining nodal points which are differently spaced with respect to said object to be measured and wherein the axes of light rays coordinated to said nodal points of said imaging systems intersect each other in the direction of said object to be measured.

* * * * *